Patented Aug. 7, 1951

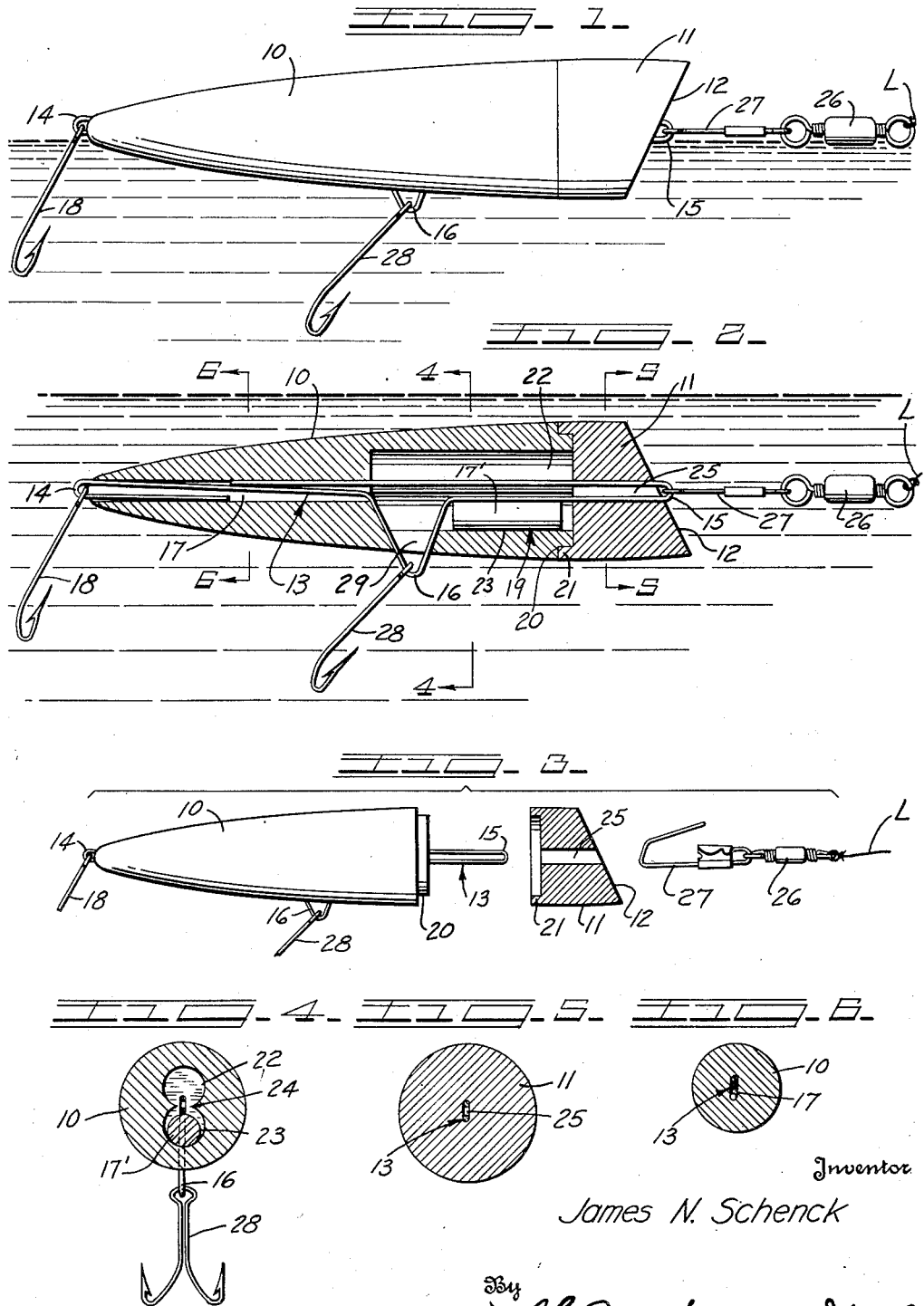

2,563,282

UNITED STATES PATENT OFFICE 2,563,282

FISH LURE

James Norton Schenck, Hornell, N. Y.

Application July 13, 1949, Serial No. 104,409

5 Claims. (Cl. 43—42.36)

1

The invention relates to improvements in fish lures of the plug type adaptable as a surface, an underwater, or a bottom bait.

The primary object of the invention is to provide a fish lure having a head formed with an inclined front face which is reversible to cause the lure to float on the surface, or to dive under the surface of the water, and at the same time provide a construction by which the head will be held positively in position without chance of its being bent out of alignment with the body and without the use of springs or locking pins.

Another object of the invention is to provide in a plug bait of this character improved means for varying the weight of the device to make it adaptable for use as an under-water or bottom lure.

A further object is to provide a simplified construction which can be cheaply manufactured and placed on the market at a low price.

Other objects in view will become apparent from the following detail description and the appended claims.

In the drawings,

Figure 1 is a side elevation of the device showing the head in position for adapting the device as a surface lure.

Fig. 2 is a vertical longitudinal section showing the head in position for adapting the device as an under-water lure.

Fig. 3 is an exploded side view showing the head in section and the snap-pin type line fastening device open.

Fig. 4 is a vertical transverse section taken on the line 4—4 of Fig. 2.

Fig. 5 is a vertical transverse section taken on line 5—5 of Fig. 2.

Fig. 6 is a vertical transverse section taken on line 6—6 of Fig. 2.

A preferred construction has been illustrated and will be specifically described, but attention is invited to the possibility of making minor variations within the scope of the invention as claimed.

In the preferred embodiment shown 10 denotes the body of the artificial bait or lure and 11 the head which forms an extension of the body. These parts are of generally cylindrical shape but the body is tapered rearwardly as is common in plug baits. The head is formed with the usual inclined front end 12 and is detachably and reversibly fastened to the body by improved means so that said inclined face or end 12 may be positioned to extend downwardly and rearwardly as in Fig. 1 to act as a surface lure and when reversed as shown in Fig. 2, to extend upwardly and rearwardly to cause the device to dive and operate under the surface of the water. The body and head are made of floatable material of any kind and may be molded from a suitable plastic of any color or colors.

To lock the head and hold it non-rotatably on the body in either of its two positions, the combined head hook and line fastening member 13 shown in Fig. 2 is employed. This member or hanger 13 is preferably formed from a single piece of resilient wire and may be made of stainless steel or any suitable non-corrosive material. It embodies a body portion extending axially through the body and head of the lure with a rear loop 14, a front loop 15 and preferably an intermediate loop 16. The rear loop 14 formed by bending one end of the wire upon itself, is flat and is positioned in a flat-walled bore 17 formed axially in the rear portion of the body 10, said loop projecting sufficiently from the rear end of the bait to provide an eye for the attachment of a fish hook 18.

The bore 17 opens into the rear part of a chamber or recess 19 formed in the forward and central part of the body 10 and adapted to receive one or more weights which will cause the bait to travel to a greater or less depth in the water. The chamber 19 opens through the flat front end of body 10 is is adapted to be closed by the head 11 as shown in Fig. 2. A telescopic connection is provided between the head and body by forming the flat front end of the body with an annular groove or recess 20 to receive an annular rearwardly projecting flange 21 formed on the rear end of the head by recessing it to receive the reduced front end of the body. The chamber or cavity 19 may take various shapes but is preferably formed by upper and lower cylindrical bores 22, 23 which intersect and communicate with each other at 24 as seen in Fig. 4. A weight 17, such as a cylindrical lead slug, is shown in the lower portion 23 of the cavity in Figs. 2 and 4, so that the lure will always be maintained in an upright position in the water. The size and shape of the weight or weights in either of the two portions of the cavity 19 may be varied according to the desired use of the bait.

The loop 15 at the front of the combined head, hook and line fastener or hanger 13 is also flat and is formed by bending an intermediate portion of the wire upon itself. It extends through a flat-walled bore 25 formed centrally in head 11, the end of the loop projecting sufficiently beyond the inclined front 12 of the head to serve as an eye for a detachable fastening for the fishing line L. It will be noted that the opposed flat walls of the bores 17 and 25 are disposed on opposite side of the central longitudinal axis of the lure and that the size of the flat loops 14 and 15 is such that they cannot turn in the bores. The head will thus be effectively prevented from rotating with respect to the body. The line is connected to one eye of the usual swivel connection 26, the other eye of which has attached to it a safety-pin of snap hook 27. When the hook 27 is engaged with the loop or eye 15, the head 11 will be maintained in its telescoped position on the body of the lure and there will be no danger of the member being bent and the head 11 becoming detached from the body or angularly positioned with respect thereto. However, when the hook 27 is opened and removed from loop 15, the head may be readily slipped off of the loop to permit it to be reversed or to permit a weight to be inserted in or removed from the cavity 19. Since the loop is flat and is held against rotation by the flat walls of bore 25, the head cannot rotate out of either of its two positions.

If desired, the lure may be provided with a second or bottom hook 28 which is detachably engaged with the intermediate loop 16. The latter is preferably formed by bending an intermediate portion of the body of the wire member 13 into V-form as shown in Fig. 2 so that it projects through a longitudinally elongated opening or slot 29 formed in the bottom of the body and communicating with the inner portion of the cavity 19. The member 13 is preformed and sufficiently resilient to permit it to be inserted into the body through the open end of cavity 19, the loop 16 being sprung into opening 29. The extreme ends of the wire member 13 may extend inwardly from loops 14, 15 to any desired extent. It will be noted that the relative distances between projecting end portions of the loops 14 and 15 and the distances between the outermost ends of the bores 17 and 25 are such that when the hook and the line fastener are engaged with the loops, the latter will force either the hook or the line fastener against the respective end of the lure to prevent sufficient endwise movement of the member 13 in the bores to permit the flange 21 from being disengaged from its seat 20. It will also be noted, upon reference to Fig. 2, that any substantial endwise shifting of the member 13 in the lure may be prevented by making the flat bottom loop 16 V-shaped so that its two arms will engage the ends of the longitudinally extending slot 29.

The fish hooks 18 and 28 may be of any form and are preferably detachably engaged with the loops 14 and 16 so that they may be removed from the lure to permit it to be carried in a garment pocket or placed in a tackle box without danger of the hooks snagging anything. The hooks as shown are of the double type having their resilient shanks connected by an eye and may be readily threaded into the loops as will be seen on reference to Fig. 4.

Because of the specific construction of the device, it may be made to sell at a low price and it is adaptable to various uses. It may be quickly changed to make it usable on the surface or at any desired depth, or to make it dive down or dart up in the water. By making the head detachable, and providing heads of different colors, the appearance of the lure may be readily changed. The one-piece fastening member or hanger does away with the use of screw eyes and similar separate fastenings for the hooks and line, and also does away with complicated locking devices for the reversible head, and at the same time permits the various parts to be easily separated for safe carrying or compact storage.

What is claimed is:

1. A fish lure comprising an elongated body and a detachable and reversible head forming an extension of said body and having an inclined front end, said body and head having longitudinally telescoped portions and being formed with open, centrally and longitudinally disposed bores having opposed flat walls disposed on opposite sides of the longitudinal axis of the lure, the flat walls of the bore in said head being longitudinally alineable with the flat walls of the bore in said body in either of the reversible positions of said head, and means for detachably and nonrotatably securing said head to said body, said means comprising a one-piece resilient wire member removably arranged in said chamber and both of said bores, said member having one end portion bent upon itself to form a flat rear loop non-rotatably and removably positioned in the bore of said body and projecting beyond the rear end of the latter to removably receive a fish hook, and another portion of said member being bent upon itself to form a flat front loop non-rotatably and removably positioned in the open bore of said head and projecting beyond said inclined face to removably secure a detachable line fastener, the relative distances between the projecting end portions of the loops and the distances between the outermost ends of the bores being such that when a fish hook and a line fastener are engaged with the loops, the latter will force either the fish hook or the line fastener against the respective end of the lure to prevent sufficient longitudinal movement of said member in said bores to permit disengagement of the telescoped portions of said head and body.

2. The structure of claim 1 in which said body has at its front end a longitudinally-extending weight-receiving chamber closed at one end by said head and into which said bores open, said body being also formed between its ends with a bottom opening which opens into the inner portion of said chamber, and in which a portion of said member within said chamber is bent to provide a V-shaped laterally-projecting loop which extends through said bottom opening to receive a second fish hook, the resiliency of said member permitting said V-shaped loop to be inserted in the open end of said chamber and sprung into said bottom opening.

3. A fish lure comprising a substantially cylindrical body tapered rearwardly and having a flat front end formed at its edge with an annular seat, said body being formed in its front portion with a longitudinally-extending weight-receiving chamber opening through its front end, said body being also formed with a centrally-arranged, longitudinal, flat-walled bore extending rearwardly from the rear of said chamber and opening through the tapered rear end of the body, said body being further formed adjacent its central portion with a radially and longitudinally extending slot forming a bottom opening which opens into the rear portion of said chamber, a detachable and reversible, cylindrical head at the front end of said body and having an inclined front face and a centrally-arranged, flat-walled bore to be longitudinally alined with said flat-walled bore of the body in either of two positions of said reversible head, the latter having a rearwardly-extending, annular flange to telescopically engage said seat, and means for detachably and non-rotatably securing said head and said body, said means comprising a one-piece member of resilient wire extending through said chamber and said bores, one end portion of said member being bent upon itself to form a flat rear loop non-rotatably disposed in the flat-walled bore at the rear of said body and projecting beyond the latter to removably attach a fish hook to said body, the other end portion of said member being bent upon itself to form a flat front loop removably and non-rotatably disposed in the flat-walled bore of said head and projecting beyond the inclined face of the latter to receive a detachable line fastener, and an intermediate portion of said member being formed with a V-shaped, laterally-extending loop disposed in said chamber and extending through said bottom opening to removably secure a second fish hook to said body, said member being sufficiently resilient to permit said V-shaped loop to be inserted through the open end of said chamber and sprung into the slot forming said opening, the relative distances between the projecting end portions of the loops and the distances between the outermost ends of the bores being such that when a fish hook and a line fastener are engaged with the loops, the latter will force either the fish hook or the line fastener against the respective end of the lure to prevent sufficient longitudinal movement of said member in said bores to permit disengagement of said flange from said seat.

4. A fish lure comprising a substantially cylindrical body tapered rearwardly and having in its forward portion a longitudinally extending weight-receiving chamber opening through its front end, said body also having an axially arranged bore extending from its rear end and opening into the rear of said chamber, said body being further formed adjacent its central portion with a radially and longitudinally extending slot forming a bottom opening which opens into said chamber, a detachable cylindrical head at the front end of said body to close said chamber, said head having an inclined front face and a central longitudinal bore in alinement with said bore in the body, said body and head having telescoped portions disengageable by relative longitudinal movement of the body and head and a one-piece member of resilient wire extending longitudinally through said chamber and bores and removably arranged therein, one end portion of said member being bent upon itself to form a rear loop disposed in the bore of the body and projecting beyond the latter to removably attach a fish hook to the rear of the body, the other end portion of said member being bent upon itself to form a front loop disposed in the bore of the head and projecting beyond the inclined face of the latter to receive a detachable line fastener, and an intermediate portion of said member being formed with a substantially V-shaped laterally extending loop disposed in said chamber and extending through said slot to removably secure a second fish hook to said body, the arms of said V-shaped loop being engaged with the ends of said slot to prevent endwise movement of said member in said bores, said member being sufficiently resilient to permit said V-shaped loop to be inserted through the open end of said chamber and sprung into said slot.

5. A fish lure comprising an elongated body and a detachable and reversible head forming an extension of said body and having an inclined front end, said body and head having longitudinally telescoped portions and being formed with open, centrally and longitudinally disposed bores having opposed flat walls disposed on opposite sides of the longitudinal axis of the lure, the flat walls of the bore in said head being longitudinally alineable with the flat walls of the bore in said body in either of the reversible positions of said head, said body being also provided with a longitudinally extending weight-receiving chamber which opens through its front end and is closed by said head, said flat walled bores opening into the opposite ends of said chamber, said body being further provided with a longitudinally extending slot opening through the bottom of the body and into said chamber, and means for detachably and non-rotatably securing said head to said body, said means comprising a one-piece resilient wire member removably arranged in said chamber and bores, said member having one end portion bent upon itself to form a flat rear loop non-rotatably and removably positioned in the bore of said body and projecting beyond the rear end of the latter to removably receive a fish hook, another end portion of said member being bent upon itself to form a flat front loop non-rotatably and removably positioned in the bore of said head and projecting beyond said inclined face to removably secure a detachable line fastener, and an intermediate portion of said member being bent to provide a laterally projecting loop disposed in said chamber and projecting through said slot to removably receive a second fish hook.

JAMES NORTON SCHENCK.

REFERENCES CITED

The following references are of record in the file of this patent:

UNITED STATES PATENTS

| Number | Name | Date |
|---|---|---|
| 1,316,040 | Jamison | Sept. 16, 1919 |
| 2,295,292 | Rogers | Sept. 8, 1942 |
| 2,482,309 | Wilson | Sept. 20, 1949 |